L. R. SAUNDERS.
AUXILIARY AIR VALVE FOR INTERNAL COMBUSTION ENGINES.
APPLICATION FILED SEPT. 21, 1912.
1,081,776.
Patented Dec. 16, 1913.
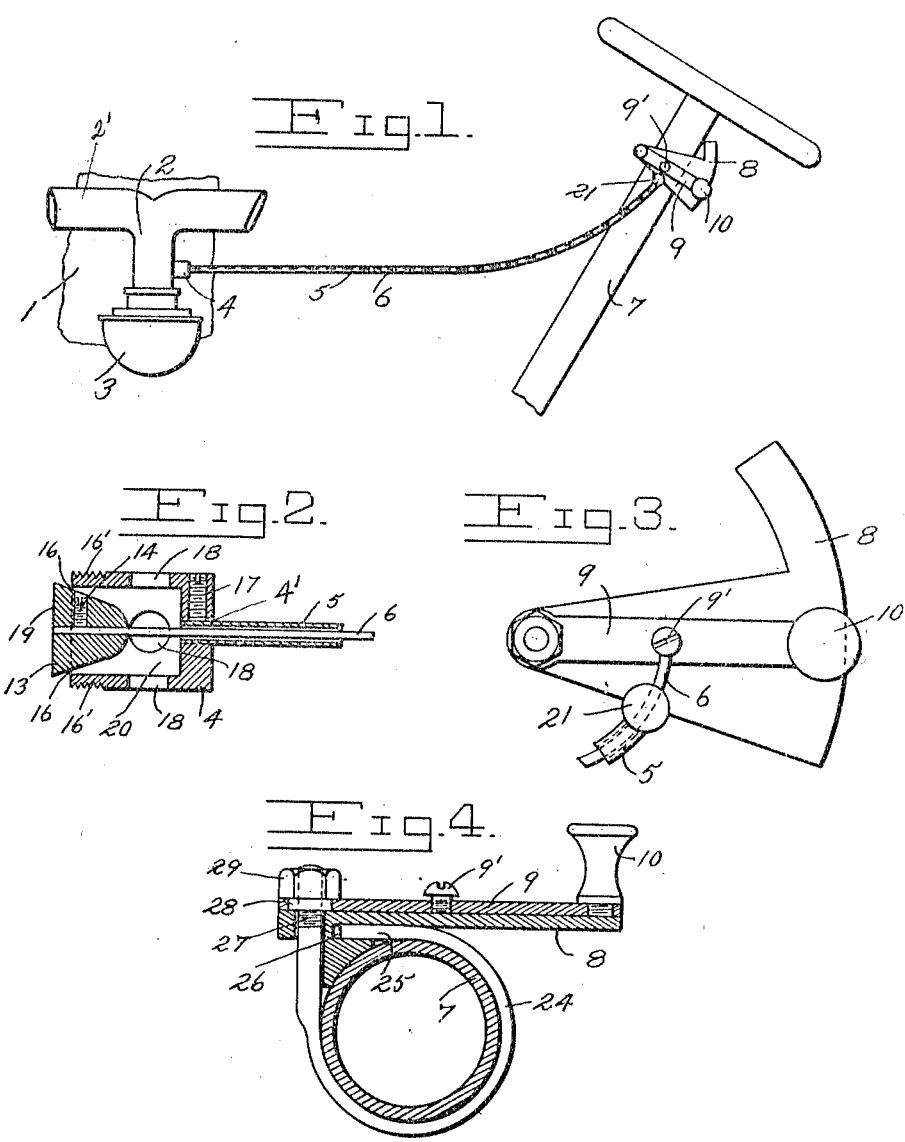
Witnesses,
J. E. Bookstaver
M. E. Kinsly
Inventor,
Leslie R. Saunders.
By Luther L. Mack
Attorney.

UNITED STATES PATENT OFFICE.

LESLIE R. SAUNDERS, OF LOS ANGELES, CALIFORNIA, ASSIGNOR TO LESLIE R. SAUNDERS COMPANY, OF LOS ANGELES, CALIFORNIA, A CORPORATION OF CALIFORNIA.

AUXILIARY AIR-VALVE FOR INTERNAL-COMBUSTION ENGINES.

1,081,776.   Specification of Letters Patent.   Patented Dec. 16, 1913.

Application filed September 21, 1912. Serial No. 722,538.

*To all whom it may concern:*

Be it known that I, LESLIE R. SAUNDERS, a citizen of the United States, residing at Los Angeles, in the county of Los Angeles and State of California, have invented a new and useful Auxiliary Air-Valve for Internal-Combustion Engines, of which the following is a specification.

My invention relates to improvements in auxiliary air valves for internal combustion engines, and an object of my invention is to provide an auxiliary valve to the inlet pipe of such an engine that will be simple in construction, cheap in manufacture, and positive and certain in action. This valve is an improvement not only upon the construction, but also upon the operation of other valves of its class. Hitherto such valves have not provided for a proper spreading out of the current of air as it enters the intake pipe of the manifold. By this invention, however, as thin current of air is delivered into the intake pipe 2 from all sides of the valve member 19, which causes the additional air supplied to be thoroughly mixed with the fuel mixture in the intake pipe of the manifold. Furthermore, there is a contraction of the air passage due to the conical shape of the valve member 13 toward the point at which the air is delivered to said intake pipe 2, with the result that the air enters said pipe at a high velocity, and a thorough mixing of the additional air with the fuel mixture results.

I attain this object by means of the mechanism illustrated in the accompanying drawings, in which—

Figure 1 is a view in elevation of my device in position. Fig. 2 is a sectional view of the valve enlarged. Fig. 3 is a side elevation of the lever end. Fig. 4 is a sectional view of the same.

To the inlet pipe between the manifold 2' of the internal combustion engine 1, and the carbureter 3, I connect my auxiliary valve. This valve is a very small and compact casing 4 which is provided with the perforations 18. In this casing is a slidable valve member 13 of slightly conical shape, the larger end 19 of which protrudes through the open end 16 of the casing into the inlet pipe 2 and is slightly larger than said opening. In the closed end of the casing 4 is made the opening 4' in which is inserted the flexible pipe 5 which is secured by means of the set screw 17. The flexible rod 6 is inserted in the valve member 13 where it is secured by means of the set screw 14. This rod runs out through the tube 5 and may be connected with the hand lever 9 by means of the screw 9', the end of the flexible tube 5 being secured to the arc 8 by means of the screw 21. This arc 8 is attachable to the shaft 7 of the steering wheel of an automobile by means of the strap 24, one end, 25, of which is swaged in the slot 26 of the arc, and the other end 27 after passing around the said steering shaft is inserted through the hole 28 in the arc, the extreme end being threaded and serving as a pivot for the lever 9. The nut 29 is screwed on the end of the pivot to hold the lever in position. The handle 10 is screwed into the other end of the lever 9.

In operation, the movement of the lever by the driver of an automobile will push the valve member 13 into the pipe 2, thus allowing the auxiliary air from the perforations 18 to enter the inlet pipe and mix with the gas. As the valve member 13 is approximately bell shaped and the opening 16 of the casing is left with a sharp true edge, the opening can be closed tightly without danger of the valve member 13 sticking. Thus the valve is made free acting and effective in a very small casing. The exact seating of the valve 13 is insured by reason of the same being connected to a somewhat flexible wire which pulls said valve up against its seat, and allows the valve to adjust itself accurately to its seat.

My device is therefore not only novel and effective but very simple and cheap in manufacture.

What I claim as my invention and desire Letters Patent for is:—

1. In auxiliary air supply mechanism for internal combustion engines, the combination with an additional air inlet tube having means for attachment at its inner end to the main inlet tube of the engine and having a valve seat on said inner end, of an outwardly tapered conical valve plug coöperating with the seat and capable of free lateral movement to adjust itself properly against said seat, said valve having its larger end projecting beyond said additional air inlet tube and being thus movable into the main inlet tube when said valve is opened, and a flexible wire secured to said conical valve plug and projecting from its outer end to draw the plug to its seat against the suction of the engine, the flexibility of said wire permitting the plug to laterally adjust itself.

2. The combination with an internal combustion engine, a carbureter, and a main inlet pipe connecting the two, of an auxiliary air inlet tube connected to the main inlet pipe between the carbureter and engine, said tube having a valve seat at its inner end, an outwardly tapered controlling valve coacting with the seat and moving to open position into the main inlet pipe transversely thereof, and means extending longitudinally of the auxiliary air inlet tube and projecting from the outer tapered end of the valve for moving the same to closed position.

LESLIE R. SAUNDERS.

Witnesses:
J. E. BOOKSTÄVER,
M. C. KINNEY.